United States Patent
Kimura

(10) Patent No.: US 6,263,611 B1
(45) Date of Patent: Jul. 24, 2001

(54) SELF-PROPELLING FISHING FLOAT

(76) Inventor: Isao Kimura, 5921-10, Kimagase, Sekiyado-machi, Higashikatsushika-gun, Chiba-ken (JP), 270-0222

( * ) Notice: Subject to any disclaimer, the term of this patent is extended or adjusted under 35 U.S.C. 154(b) by 0 days.

(21) Appl. No.: 09/450,508

(22) Filed: Nov. 30, 1999

(30) Foreign Application Priority Data

Dec. 3, 1998 (JP) .................................................. 10-360026

(51) Int. Cl.[7] .................................................. A01K 89/00
(52) U.S. Cl. .................................................. 43/26.1
(58) Field of Search .................................................. 43/26.1

(56) References Cited

U.S. PATENT DOCUMENTS

| | | | | |
|---|---|---|---|---|
| 1,850,296 | * | 3/1932 | Vermeulen | 43/26.1 |
| 2,693,047 | * | 11/1954 | Lumsden | 43/26.1 |
| 2,726,471 | * | 12/1955 | Uus | 43/26.1 |
| 2,803,914 | * | 8/1957 | Ellis | 43/26.1 |
| 2,804,712 | * | 9/1957 | Jackson | 43/26.1 |
| 3,203,131 | * | 8/1965 | Myers | 43/26.1 |
| 3,618,254 | * | 11/1971 | Myers | 43/26.1 |
| 5,077,929 | * | 1/1992 | Khan | 43/26.1 |
| 5,086,581 | * | 2/1992 | Barra et al. | 43/26.1 |

* cited by examiner

*Primary Examiner*—Kurt Rowan
(74) *Attorney, Agent, or Firm*—Armstrong, Westerman, Hattori, McLeland & Naughton, LLP

(57) ABSTRACT

A fishing float self-propelling for a wide range of a fishing place and adapted to suspend a terminal tackle to a predetermined water depth at a desired position, in which a float main body for engaging a line and a terminal tackle comprises a propelling device, a switch for the propelling device, a switch operation bar for turning the switch to OFF by the tension upon pulling back the line, and a line lock mechanism that stops the line in communication with the terminal tackle when the switch operation bar is at a switch ON position while releases the line from engagement when the switch operation bar is at the switch OFF position, the propelling device being preferably disposed in the hollow portion of the float main body.

4 Claims, 3 Drawing Sheets

SELF-PROPELLING FISHING FLOAT

BACKGROUND OF THE INVENTION

1. Field of the Invention

The present invention concerns a fishing float and, more in particular, it relates to a float suitable to fishing of bringing a terminal tackle to a distant point.

2. Statement of the Related Art

In cast-fishing, a terminal tackle with a sinker and a bait is thrown or cast to an aimed point, generally, by utilizing the resiliency of a fishing rod but this requires a considerable physical strength and skills, as well as there is an inevitable limit for a range to be reached. Therefore, if the aimed point is at a long distance, a fisherman has to go near the point by using a boat or the like.

Furthermore, upon casting the terminal tackle, it sometimes occurs that a bait is disintegrated in the course of throwing or a fishing line is disconnected by the weight of a thrown sinker.

Further, when the surface of the water around the aimed point is calm, it may be a worry that splashes upon casting the sinker of the terminal tackle disturbs the surface of the water to give warning to fishes.

OBJECT OF THE INVENTION

It is, accordingly, a first object of the present invention to provide a float capable of self-propelling and reaching a wide range of a fishing point by an automatic propelling device.

A second object of the present invention is to provide a float capable of self-propelling and reaching a fishing point by a propelling device and stopping the propelling device by the operation at hand to a fishing rod when the float reaches the aimed point.

A third object of the present invention is to provide a float capable of self-running and reaching a fishing point by a propelling device, stopping the propelling device by the operation at hand to a fishing rod when the float reaches the aimed point and suspending a terminal tackle in water at that position to a predetermined depth.

A fourth object of the present invention is to provide the float which is described as above and which is free from the worry that a terminal tackle, a line or obstacles in the water are not entangled to the propelling device.

SUMMARY OF THE INVENTION

The first object of the present invention can be attained by a self-propelling fishing float, having a float main body that engages a line and a terminal tackle, the float main body comprising:

a propelling device operated by a driving unit and a switch for controlling the ON/OFF operation of the propelling device.

The second object of the present invention can be attained by a self-propelling fishing float, having a float main body that engages a line and a terminal tackle, the float main body comprising:

a propelling device operated by a driving unit and a switch for controlling the ON/OFF operation of the propelling device, and a switch operation bar connected to the switch at one end, connecting a line at the other end thereof and controlling the switch to OFF by a tension of the line when it is taken-up.

A third object of the present invention can be attained by a self-propelling fishing float having a float main body that engages a line with a stopper and a terminal tackle, the float main body comprising:

a propelling device operated by a driving unit a switch for controlling the ON/OFF operation of the propelling device, a switch operation bar which is engaged at one end of a bar slidably attached to the float main body to the switch and has a ring part formed at the other end of the bar for allowing a line in connection with a terminal tackle to pass therethrough and engaging the stopper of the line, and a line lock mechanism that engages to stop the line in cooperation with the ring part of the switch operation bar when the switch operation bar is at a switch ON position while releases the engagement for the line when the ring part of the switch operation bar is at the switch OFF position, wherein the switch operation bar is displaced by the tension upon pulling back the line to turn the switch for the propelling device to OFF and the engagement of the line lock mechanism is released.

A fourth object of the present invention can be attained by a self-propelling fishing float as defined above, wherein a hollow portion having a water suction port and a water discharge port is formed in a body portion of the float main body and the propelling device is disposed within the hollow portion.

DESCRIPTION OF THE ACCOMPANYING DRAWINGS

PREFERRED EMBODIMENTS OF THE INVENTION

Figure 1:
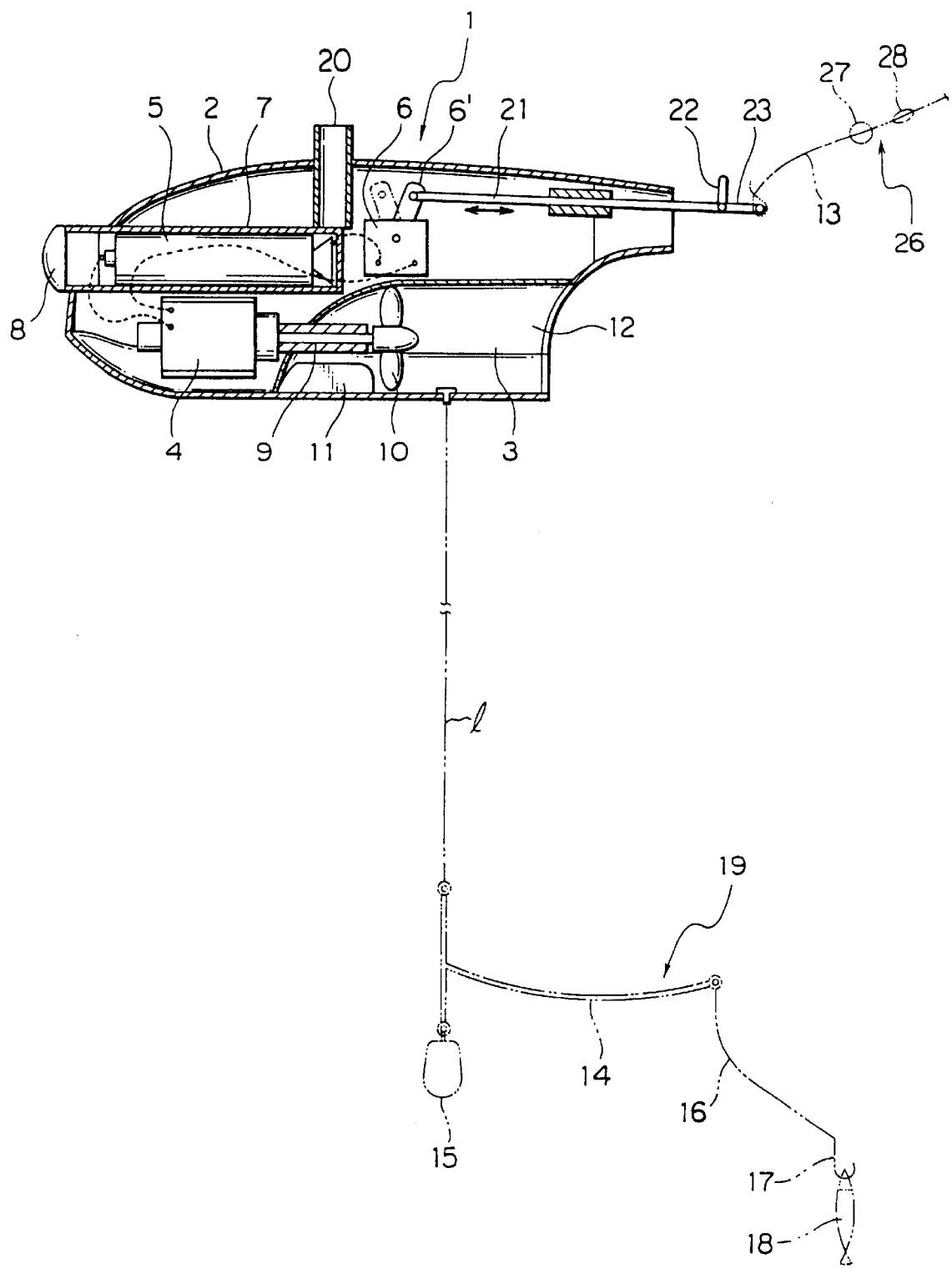
FIG. 1 is a vertical cross sectional view of a float along an axial direction in one embodiment according to the present invention.

A basic constitution of the present invention comprises a float main body for engaging a line and a terminal tackle, the float main body comprising a propelling device actuated by a driving unit, and a switch for controlling the ON/OFF operation of the propelling device.

The drawings show one embodiment of the present invention, in which a float main body 1 has a casing 2 of a shape like a small boat. The casing 2 has a dome-shaped hollow portion 3 in a submerged body portion which is opened at a rear end, and has a tube 20 fixed at a back for attaching a mark rising above the surface of the water.

Inside of the casing 2, are incorporated a motor 4, a battery 5 as a power source for the motor 4, and a rotational driving unit comprising a switch 6 for controlling the ON/OFF operation of the motor 4. The battery 5 is housed in a battery case 7 having an outwarded insertion port and tightly sealed by a cap 8.

A rotational shaft 9 of the motor 4 disposed in the casing 2 is protruded in a liquid seal manner to the hollow portion 3 of the float main body 1, and a propelling screw 10 or like other propelling member is attached to the top end of the shaft.

A water suction port 11 is disposed ahead of the propelling screw 10 in the hollow portion 3, such that the float main body 1 self-propels or runs by itself on the water surface while sucking water and discharging the same from a jet discharge portion 12 at the rear end of the hollow portion 3 by the rotation of the screw 10.

The float main body 1 is connected with a second line 13 from the top end of a fishing rod (not illustrated), and a first line 1, with a so-called terminal tackle 15 comprising, for example, a balance 14, a sinker 15, a leader 16, a fishing hook and a bait 18 is suspended below the float main body 1.

Then, when the float main body 1 is caused to float on the surface of the water with the switch 6 being turned ON, the float main body 1 self-propels on the water surface by the propelling screw 10 and it can reach an aimed place while amending the running direction by swinging the line 13 leftwards or rightwards by the fishing rod.

The basic constitution of the self-propelling float according to the present invention is as has been described above and it is necessary for the self-propelling float that the screw 10 be stopped to terminate propulsion when the float reaches an aimed point.

For this purpose, in the embodiment shown in FIG. 1, a switch operation bar 21 is attached for the inside and the outside of the rear portion of the casing, slidably, in a forward-to-backward direction and in a liquid seal manner by way of a waterproof seal. The switch operation bar 21 is connected at the top end thereof with a lever 6' of the switch 6, and is connected at the rear end thereof with the line 13 of the fishing rod.

When the float main body 1 is caused to self-propel with the switch 6 being turned ON by pushing a handle 22 of the switch operation bar 21 forwardly. Then, the fishing rod is pulled at the instance the float main body reaches the aimed point, and the switch operation bar 21 is pulled backwardly by the tension of the line 13, by which the switch 6 is turned OFF by the switch 6 is turned OFF to stop propulsion of the float main body 1.

In the embodiment shown in FIG. 1, it is not always necessary that the line 13 and the terminal tackle 19 are connected in series but each of them may be joined independently to the float main body 1.

Figure 2:
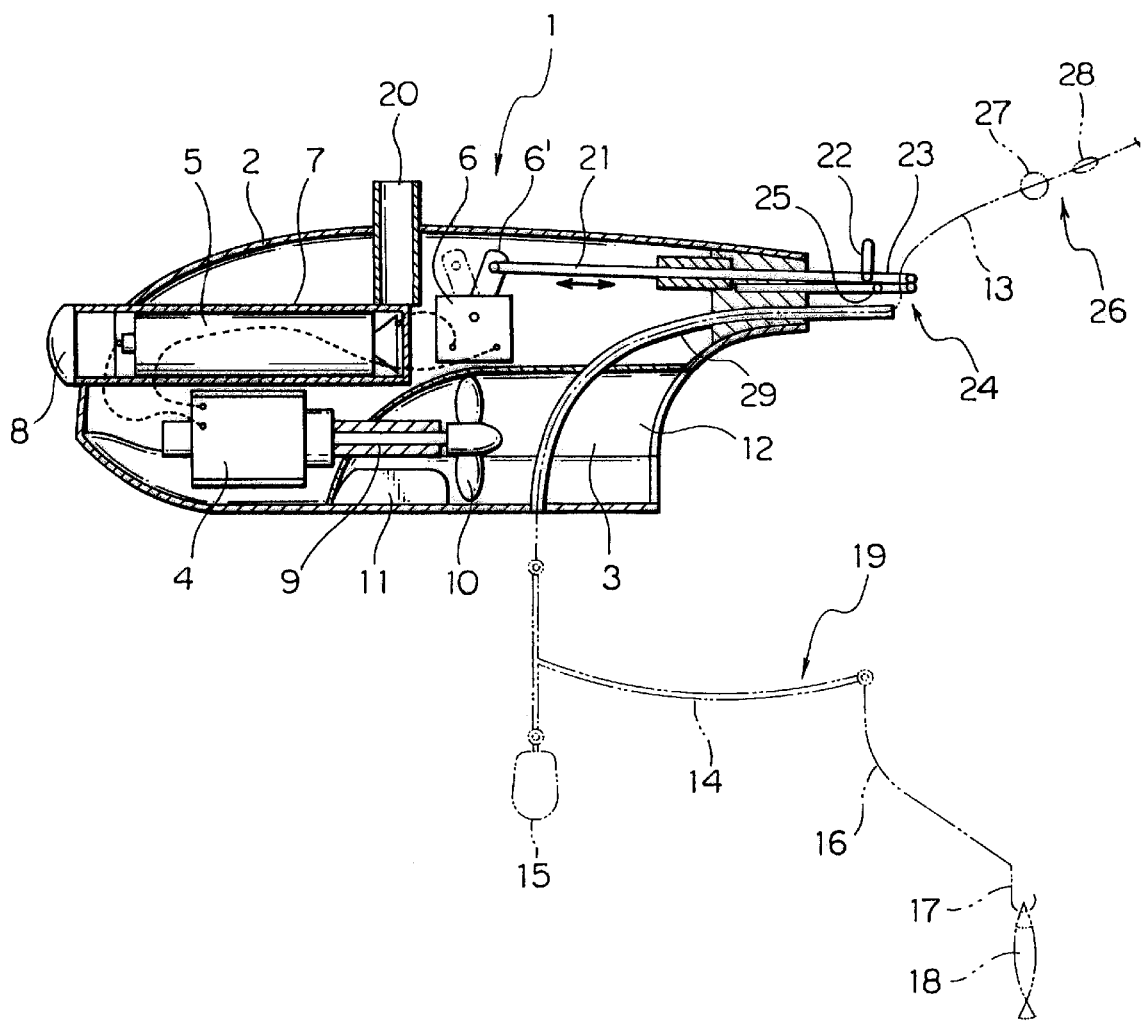
FIG. 2 is a vertical cross sectional view of a float along an axial direction in another embodiment according to the present invention.
Figure 3:
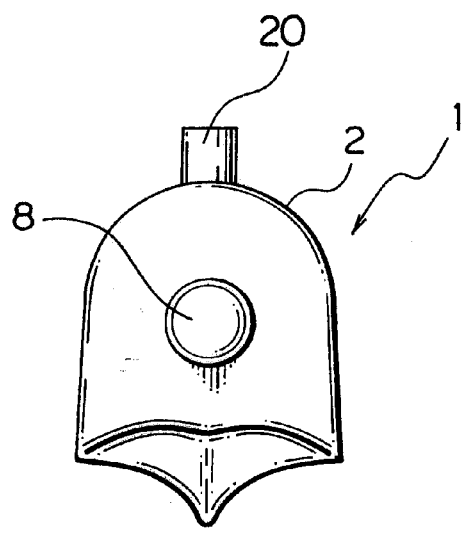
FIG. 3 is a front elevational view of the float as viewed from a forward portion.
Figure 4:
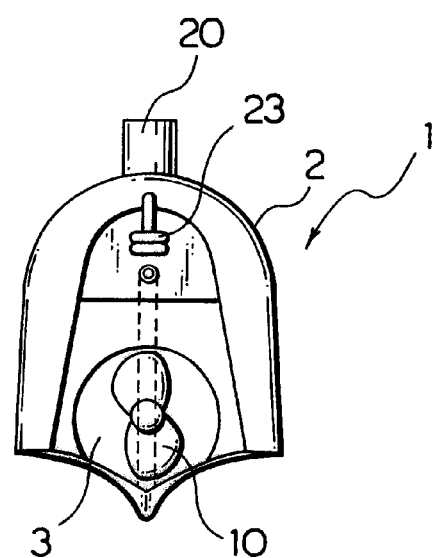
FIG. 4 is a back elevational view of the float.

FIG. 2 shows another embodiment of the present invention in which identical portions or members with those in FIG. 1 are carry identical reference numerals.

The float in this embodiment is adapted to self-propel to the point or be pull up in a state where the terminal tackle 19 is brought closer to the float main body 1 and not suspended for a long distance therefrom, and also adapted to stop the propelling screw 10 when the float reaches the aimed point, and suspend the terminal tackle to a predetermined depth.

For this purpose, in the float main body 1 of the embodiment shown in FIG. 2, a ring part 23 is formed to the top end of the switch operation bar 21 slidably protruded to the rear portion of the casing 2 for allowing the line 13 of a fishing rod to pass therethrough and for engaging float stop bead 27 for the line 13 to be described later, and a line lock mechanism 24 is disposed such that it corporate with the ring part 23 so as to stop the line 13 when the switch operation bar 21 moves to the ON position for the switch and release the engagement of the line 18 when the operation bar moves to the OFF position of the switch.

The line lock mechanism 24 in the illustrated embodiment comprises the ring part 23 of the switch operation bar 21 which moves forwardly and backwardly to turn the switch to ON/OFF position and a receptacle 25 fixed to the rear part of the casing 2 and adapted to be in sliding contact with the ring part 23 to clamp (engage) the line 13 when the switch operation bar 21 moves to the switch ON position and release the clamping (engagement) of the line 13 when the ring part 23 of the switch operation bar 21 moves to the switch OFF position.

It is necessary that the line 13 and the terminal tackle 19 engaged with the float of the embodiment shown in FIG. 2 are connected in series, and a stopper 26 is attached to the line 13 between the fishing rod and the float main body for controlling the suspended length of the terminal tackle 19 below the float to a predetermined length.

The stopper 26 of the illustrated embodiment comprises a bead 27 for allowing the line 13 to pass therethrough and a bead retainer 28 fixed to a predetermined position on the line 13 for stopping the bead 27, and the bead 27 has a larger diameter than that of the ring part 23 of the switch operation bar 21.

In the float of the embodiment shown in FIG. 2, a portion of the line 13 ahead of the stopper 26 is passed through the ring part 23 of the switch operation bar 21 and the ring part of the receptacle 25 and then passed through a guide line tube 29 which is in communication with a predetermined bottom of the float main body 1 and then connected to the terminal tackle 19.

Figure 5:
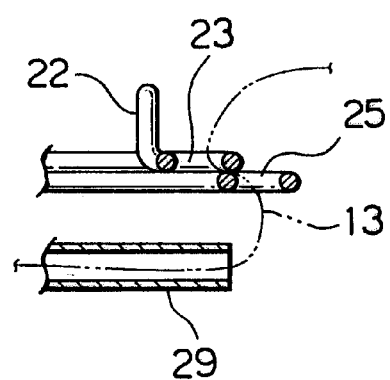
FIG. 5 is an explanatory view for the operation of a main part in FIG. 2 in which the line is engaged.

In the float of the embodiment shown in FIG. 2, the line 13 is taken-up around a reel of the fishing rod till the terminal tackle 19 engages the float main body 1. When the switch operation bar 21 is pushed forward to the ON position in this state, the screw 10 rotates and, as shown in FIG. 5, the line 13 is retained being clamped between the ring part 23 of the switch operation bar 21 and the receptacle 25 constituting the line lock mechanism 24.

When the float main body 21 is placed in water in this state, the float self-propels on the surface of the water in a state where the terminal tackle 19 is pulled up to the bottom of the body portion and reaches an aimed point with the direction being controlled by the manipulation of the fishing rod.

Figure 6:
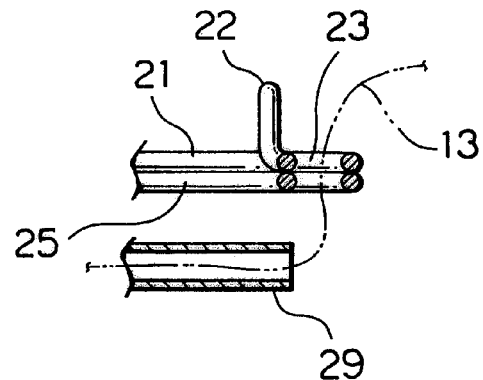
FIG. 6 is an explanatory view for the operation of a main part in FIG. 2 in which the line is released.

When the fishing rod is jerked backwardly upon reaching the aimed position, since the line 13 undergoes tension to pull the switch operation bar 21 backward, the rotation of the propelling screw 10 is stopped and the float is kept at a predetermined position and, at the same time, engagement for the line 13 is released as shown in FIG. 6. Accordingly, the line 13 is delivered downwardly by the own weight of the sinker 15 of the terminal tackle 19 and the terminal tackle 19 is caused to sink into water till the stopper 26 of the line 13 is retained to the ring part 23 of the switch operation bar 21.

When the fishing rod is pulled upwardly or the line 13 is taken up, since the line 13 is wound up through the guide line tube 29 of the float main body 1, the terminal tackle 19 is guided to the float main body 1 and stopped at the bottom of the main body 1.

In the illustrated embodiment, the propelling screw 10 rotated by the motor 5 is used as the propelling device, but the propelling device used for the float according to the present invention is not restricted only thereto, but any other propelling device, for example, a water paddling wheel rotated by a driving unit such as a motor or a jet propelling device utilizing the jetting force of a pump may also be used.

Further, while the propelling member for the propelling device such as the propelling screw 10, water paddling wheel or jet nozzle may be protruded from the float main body 1, it is desirable to form the hollow portion 3 having the water suction port 1 and the water discharge port 12 in the body of the float main body 1 and the propelling member is disposed in the hollow portion 3 as shown in the figure so that the terminal tackle, the line or obstacles in water are not entangled to the propelling member.

Since the float according to the present invention can self-propel on the surface of the water and reach the aimed point by the manipulation to the fishing rod, it is no more necessary to throw the terminal tackle. Accordingly, skilled casting technique is not necessary and various troubles such as disintegration of the bait or the disconnection of the line can be overcome.

Further, since the float is caused to self-propel, the float can be guided calmly for a greater distance and a wider range and, since the terminal tackle can be induced while running the terminal tackle in the water, fishing like that trawling can be enjoined.

Further, since the screw can be stopped by merely pulling the fishing rod, the remote control operation is facilitated and the cost can be reduced.

Furthermore, since the switch operation bar can be turned to OFF and the engagement for the line is released by the tension of the line, two different mechanisms can be operated in one touch, which is extremely reasonable and convenient.

Since the terminal tackle is pulled up to and engaged integrally with the float during self-propelling of the float in water or upon taking up of the line, there is no worry that a long suspended terminal tackle is caught and held by obstacles present in the water bottom during self-propelling or in the course of fishing up, and flow resistance is reduced when the float runs in the water.

What is claimed is:

1. A self-propelling fishing float having
    a float main body that engages a first line and a terminal tackle, the float main body comprising:
        a propelling device operated by a driving unit,
        a switch for controlling the ON/OFF operation of the propelling device, and
        a switch operation bar connected to the switch at one end, connecting a second line at the other end thereof and controlling the switch to OFF by tension of the line when it is taken-up, said switch operation bar being arranged to be slidable in a forward-to-backward direction of said float main body said switch operation bar extending from inside the float main body through a water tight seal to outside said float main body and located above said propelling device in operation.

2. A self-propelling fishing float as defined in claim 1, wherein a hollow portion having a water suction port and a water discharge port is formed in a body portion of the float main body and the propelling device is disposed within the hollow portion.

3. A self-propelling fishing float having
    a float main body that engages a line with a stopper and a terminal tackle, the float main body comprising:
        a propelling device operated by a driving unit,
        a switch for controlling the ON/OFF operation of the propelling device,
        a switch operation bar which is engaged at one end of a bar slidably attached to the float main body to the switch and has a ring part formed at the other end of the bar for allowing a line in connection with a terminal tackle to pass therethrough and engaging the stopper of the line, and
        a line lock mechanism that engages to stop the line in cooperation with the ring part of the switch operation bar when the switch operation bar is at a switch ON position while releases the engagement for the line when the ring part of the switch operation bar is at the switch OFF position, wherein
    the switch operation bar is displaced by tension upon pulling back the line to turn the switch for the propelling device to OFF and the engagement of the line lock mechanism is released.

4. A self-propelling fishing float having
    a float main body that engages a line with a stopper and a terminal tackle, the float main body comprising:
        a propelling device operated by a driving unit,
        a switch for controlling the ON/OFF operation of the propelling device,
        a switch operation bar which is engaged at one end of a bar slidably attached to the float main body to the switch and has a ring part formed at the other end of the bar for allowing a line in connection with a terminal tackle to pass therethrough and engaging the stopper of the line, and
        a line lock mechanism that engages to stop the line in cooperation with the ring part of the switch operation bar when the switch operation bar is at a switch ON position while releases the engagement for the line when the ring part of the switch operation bar is at the switch OFF position, wherein
        the switch operation bar is displaced by the tension upon pulling back the line to turn the switch for the propelling device to OFF and the engagement of the line lock mechanism is released,
        a hollow portion having a water suction port and a water discharge port is formed in a body portion of the float main body and the propelling device is disposed within the hollow portion.

* * * * *